United States Patent [19]

Hackman

[11] 4,319,788
[45] Mar. 16, 1982

[54] MEANS AND TECHNIQUES USEFUL IN MOUNTING SELF-ALIGNING BEARINGS

[75] Inventor: Kenneth V. Hackman, Arcadia, Calif.

[73] Assignee: Southwest Products Co., Monrovia, Calif.

[21] Appl. No.: 122,525

[22] Filed: Feb. 19, 1980

[51] Int. Cl.³ .............................................. F16C 23/04
[52] U.S. Cl. ................................... 308/72; 29/149.5 B
[58] Field of Search ...................... 308/15, 29, 72, 194; 29/149.5 B

[56] References Cited

U.S. PATENT DOCUMENTS

| | | | |
|---|---|---|---|
| 3,482,890 | 12/1969 | Burrell | 308/72 |
| 3,516,136 | 6/1970 | Carter et al. | 308/72 |
| 3,522,976 | 8/1970 | Spyra | 308/72 |
| 3,537,163 | 11/1970 | Steidl | 29/149.5 B |
| 3,700,295 | 10/1972 | Butzow et al. | 308/72 |
| 3,754,802 | 8/1973 | Keller | 308/72 |
| 4,129,343 | 12/1978 | Janssen | 308/72 |
| 4,140,413 | 2/1979 | Conrad | 308/29 |

FOREIGN PATENT DOCUMENTS 2201874 7/1973 Fed. Rep. of Germany ........ 308/72

*Primary Examiner*—Richard R. Stearns

[57] ABSTRACT

A self-aligning bearing and a method of forming and mounting such bearing such that it may be conveniently removed and replaced from an apertured portion of a supporting wall under conditions when access is had to one side of the wall and only limited access to the other side of the wall is available thereby obviating the necessity of expensive and time-consuming removal and replacement of constructional parts that would otherwise deny access to such other side of the wall. This in general, is accomplished by forming an apertured ball within an outer race member, threading and notching opposite ends of the race member to provide a notched portion and a threaded portion at each end of the race member, and threading a separate nut on each of the threaded portions with a deformable ring interposed between the corresponding wall and nut. Each ring has a first tab that engages a corresponding notch and a second tab that is engageable with a flat portion of a corresponding nut upon deformation of said second tab. There is, for selection, one or more notches on one end of the race member and also one or more notches on the other end of the race member with such notches on opposite ends being staggered circumferentially so that if and when desired the same bearing may be removed and replaced, end for end, in the wall opening even though there is very limited access to one side of the wall.

11 Claims, 3 Drawing Figures

U.S. Patent    Mar. 16, 1982    4,319,788
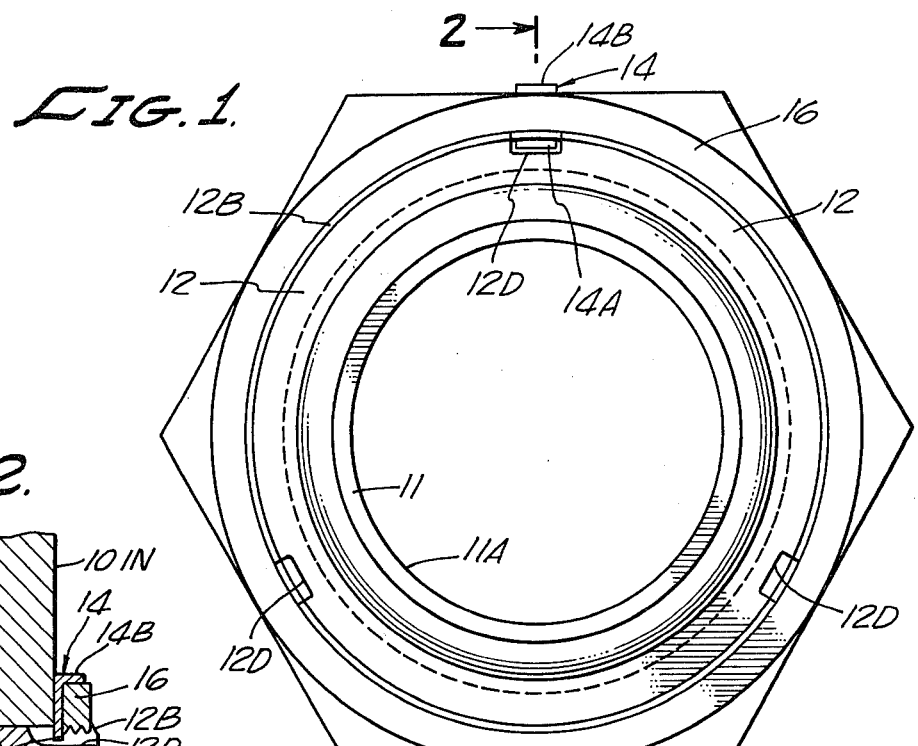
Fig. 1.
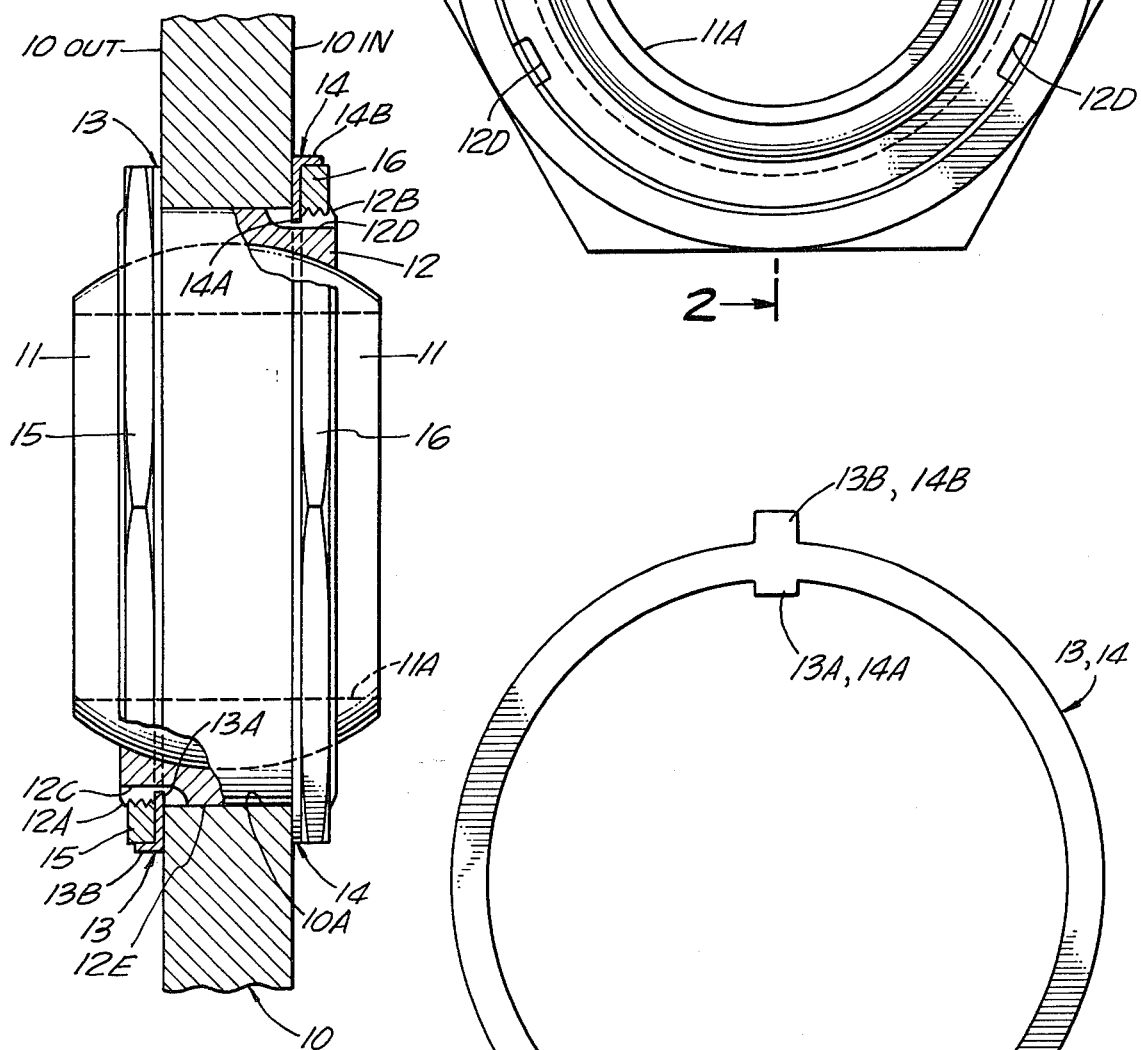
Fig. 2.
Fig. 3.

MEANS AND TECHNIQUES USEFUL IN MOUNTING SELF-ALIGNING BEARINGS

The present invention relates to self-aligning bearing assemblies and in particular to an assembly that greatly simplifies and renders their removal and replacement less expensive less time consuming and more expeditious.

An object of the present invention is to provide new and improved means and techniques to achieve the desirable features mentioned above.

A specific object of the present invention is to provide self-aligning bearing assemblies that do not require structural disassembly of an aircraft in order to achieve their removal from or replacement on such aircraft.

Another specific object of the present invention is to provide new means and techniques that bring about simplification and versatility.

In the drawing:

FIG. 1 is an end view of an assembly embodying the present invention.

FIG. 2 is a sectional view of the assembly shown in FIG. 1 stationarily mounted in a supporting structure with that sectional view of the assembly being taken as indicated by the line 2—2 in FIG. 1.

FIG. 3 is a view in elevation of one of the two deformable retaining rings in the assembly shown in FIGS. 1 and 2.

The assembly embodying features of the invention is shown stationarily mounted in an apertured portion 10A of a supporting structure illustrated as an apertured wall 10.

The assembly as shown in FIG. 1 includes six elements namely: a truncated and apertured bearing ball movably mounted in its conforming race member 12 which is accomplished by forming the race member around the ball; two identical deformable locking or retaining rings 13,14; and two identical fastening nuts each threaded on a corresponding threaded portion 12A,12B of the race member 12.

The elements 11,12 comprise a self-aligning bearing, the race member 12, being stationarily mounted and the ball 11 having an apertured portion 11A to which a shaft or pin or the like may be secured.

The race member 12 is formed with a cylindrical portion 12E which is slightly smaller in diameter than the apertured portion 10A of the supporting wall 10, and opposite end portions of such cylindrical portion are threaded to provide the threaded end portions 12A,12B. At least one notch 12C,12D is provided in the corresponding threaded end portion 12A,12B and such notch may be formed either before or after the ends of such race member are threaded.

Preferably as illustrated in FIG. 2 there are three equally circumferentially spaced notched portions 12D in threaded portion 12B and likewise, there are three equally circumferentially spaced notched portions 12C in threaded portion 12A and preferably the series of such three notched portions 12C are staggered circumferentially with respect to said series of three notched portions 12D as will be seen in the drawings wherein as illustrated in FIG. 2 the notch 12C is not aligned with the notch 12D.

While the notches 12C,12D, as illustrated, provide an interruption in the corresponding threaded portions 12A,12B it will be seen that such need not be the case because the notches may appear elsewhere in the race member 12 immediately adjacent to the threaded portion for reception of the locking tab 13A,14A of the corresponding locking or retaining ring 13,14.

Each of the two identical rings 13,14 is provided with an inwardly extending tab 13A,14A and an outwardly extending bendable or deformable tab 13B,14B for purposes of bending the same from the extended condition shown in FIG. 3 to its bent or deformed condition shown in FIG. 2 wherein it then is in a position to engage one of the six outer flat surfaces of the nut 16 to prevent its rotation on the race member 12 while at the same time the inner tab 13A,14A engages the corresponding race member notched portion 12C,12D to prevent the ring 13,14 from turning on the race member 12.

In assembling the assembly to the supporting wall 10 the outer self-aligning bearing 11,12 is slipped into the cylindrical apertured portion 10A, the rings 13,14 are assembled on opposite sides of the wall 10 so that their tabs 13A,14A enter a corresponding notch 12C,12D, the nuts 15,16 are tightened to press the rings 13,14 against the wall 10 after which the tabs 13B,14B are bent against the outer flat surface of the corresponding nuts 15,16.

This construction is particularly useful in aircraft construction and solves problems which arise when self-aligning bearings are required to be replaced after the aircraft has been built and used. While no particular problem may initially exist while the aircraft is been built in securing the self-aligning bearing to the wall 10 because both sides 10 IN and 10 OUT of the wall are conveniently accessible, difficulties arise in removal and replacement when the aircraft is completely constructed with bulkheads or other structural parts that block access to the inside wall 10 IN.

In that case removal of the assembly is effected without removal of the bulkhead or other structural parts using to advantage the constructional features of the assembly previously described. It is necessary only to have a small access opening to the inner wall 10 IN such that a small tool such as a screwdriver may be inserted through such access opening (not shown) to bend the tab 14B away from the outer surface of nut 16 and then while such tool or other small tool as for example a spanner wrench is used to prevent the nut 16 from turning, torque is applied to the other nut 15 to cause the race member to turn within the nut 16 to a disengaged condition and with the now loosened ring 14 turning with the race member 12 because tab 14A is in notch 12D.

The assembly, less the nut 16 and ring 14 may be then withdrawn through the wall opening 10A and replaced by another new self-aligning bearing and the same ring 14 and nut 16 may be reused to secure the new bearing by first inserting the ring 14 in place, threading the nut 16 on the new race member 12 and then rebending the tab 14B into engagement with the flat side of nut 14 as shown in FIG. 2.

In such assembly and disassembly, the elements on the left or on the outside of the outer wall 10 OUT, namely the following elements: locking ring 13, locking nut 15 which are used to stationarily mount the nut 15 on the outer race member 12 is considered to be a form of abutment means that has essentially two functions. It functions, by its engagement with the outer wall 10 OUT as an abutment on the race member 12 to retain the assembly in the support opening 10A, and the nut 15 of such abutment means is particularly suitable for receiving a wrench for applying torque to the assembly either in mounting the assembly on the support 10 or in the process of removing the self-aligning bearing 11,12 from the support 10. In the latter case as outlined above, the locking ring tab 13B remains bent as shown in FIG. 2 and of course the locking ring inner tab 13A is within the slotted portion 12C, i.e. the nut 15 is locked to the outer race member 12, so that application of torque to the nut 15, when the deformable tab 14B is bent back to its original condition shown in FIG. 3 and the then free nut 16 is prevented from turning results in the nut 16 being detached from the race member 12 thereby allowing the self-aligning bearing 11,12 to be withdrawn from the opening 10A.

I claim as my invention:

1. A method of forming and mounting a self-aligning bearing on a mounting structure having a mounting hole extending therethrough from an outer surface to an inner surface of said structure comprising:
    forming a generally cylindrical bearing outer race member around an inner member to provide a first and a second end portion integral with said race member;
    externally threading said first end portion of said race member to provide an external threaded portion;
    forming an open slotted portion in said race member adjacent to said threaded portion;
    forming a locking nut having complementary internal threads to provide an internal threaded portion and having an external flat portion;
    forming a locking ring having a first tab extending inwardly thereof to fit into said slotted portion and having a second deformable tab extending outwardly thereof for deformation and engagement with said flat portion;
    providing abutment means on said second end portion of said race member;
    inserting said race member through said mounting hole to engage said abutment means with said outer surface;
    inserting said locking ring over said first end portion to engage said first tab with said slotted portion;
    threading said nut on said external threaded portion to engage said locking ring and said inner structure surface; and
    deforming said second tab to engage said flat portion.

2. The method of claim 1 wherein said slotted portion extends through said external threaded portion.

3. The method of claim 1 wherein said slotted portion is formed as one of a plurality of slotted portions circumferentially spaced in said race member.

4. The method of claim 1 wherein said externally threaded portion is of substantially the same diameter as that portion of the race member within said mounting hole.

5. The method of claim 1 wherein said race member may be removed from said structure by deforming said second tab to disengage it from said flat surface and applying torque to said abutment means while at the same time preventing rotation of said locking nut.

6. The method of claim 1 wherein said abutment means is formed by threading and slotting said second end portion of said race member and using a like locking ring and a like locking nut as the previously mentioned locking ring and locking nut on said second end portion to fit the tab on said like ring into the slotted portion of said second end and to deform the deformable tab of said like locking ring into engagement with the flat portion of said like locking nut after it has been threaded onto the threaded portion on said second end of said race member.

7. A mountable self-aligning bearing assembly for mounting on a mounting structure having a generally cylindrical mounting opening that extends from an outer wall to an inner wall comprising:
    a generally spherical inner ball member having an axial bore;
    a bearing outer race member having a generally cylindrical outer surface and an inner generally spherical surface conforming with said ball member, said race member having a first end portion and a second end portion for protrusion through said mounting opening beyond said outer and inner walls, said cylindrical outer surface being between said end portions and being slightly smaller in diameter than said mounting opening;
    abutment means on one of said end portions for engagement with one of said walls;
    a screw threaded portion on the other one of said end portions;
    a locking nut threaded on said other end portion and having a flat outer surface;
    a notched portion on said other end portion; and
    a locking ring between said nut and the other one of said walls and having an inner tab in said notched portion and an outer deformable tab deformed to engage said flat surface of said nut.

8. A self-aligning bearing assembly as set forth in claim 7 wherein said abutment means includes means for releasably securing the abutment means on said one end portion of said outer race member.

9. A self aligning bearing assembly as set forth in claim 7 in which said abutment means includes a second like nut and a second like lock ring having like tabs, one of which is engageable with a like notched portion in said one end portion and the other one of said like tabs being deformable and deformed into engagement with a like flat surface on said nut, said like locking ring being interposed between said like nut and said one wall.

10. A self-aligning bearing assembly as set forth in claim 7 wherein said notched portion is one of a plurality of notched portions circumferentially space on said outer race member.

11. A mounted self-aligning bearing assembly comprising:
    a housing having a generally cylindrical mounting opening;
    a generally spherical inner ball member having an axial bore;
    a bearing outer race member having a generally cylindrical outer surface and having an internal generally spherical inner surface conforming to said ball, said outer race member having a first and a second end portion protruding through said mounting opening adjacent to a corresponding first and a second wall of said housing, said outer race member having a notched portion and a threaded portion on one of said end portions;
    a locking nut threaded on said threaded portion and having a flat portion;
    a locking ring having a first tab engaging said notched portion and a second deformable tab deformed to engage said flat portion of said nut;
    and, abutment means on the other end portion engaging one of said walls;
    said locking ring being between said nut and the other wall of said housing.

* * * * *